Figures 1, 2:
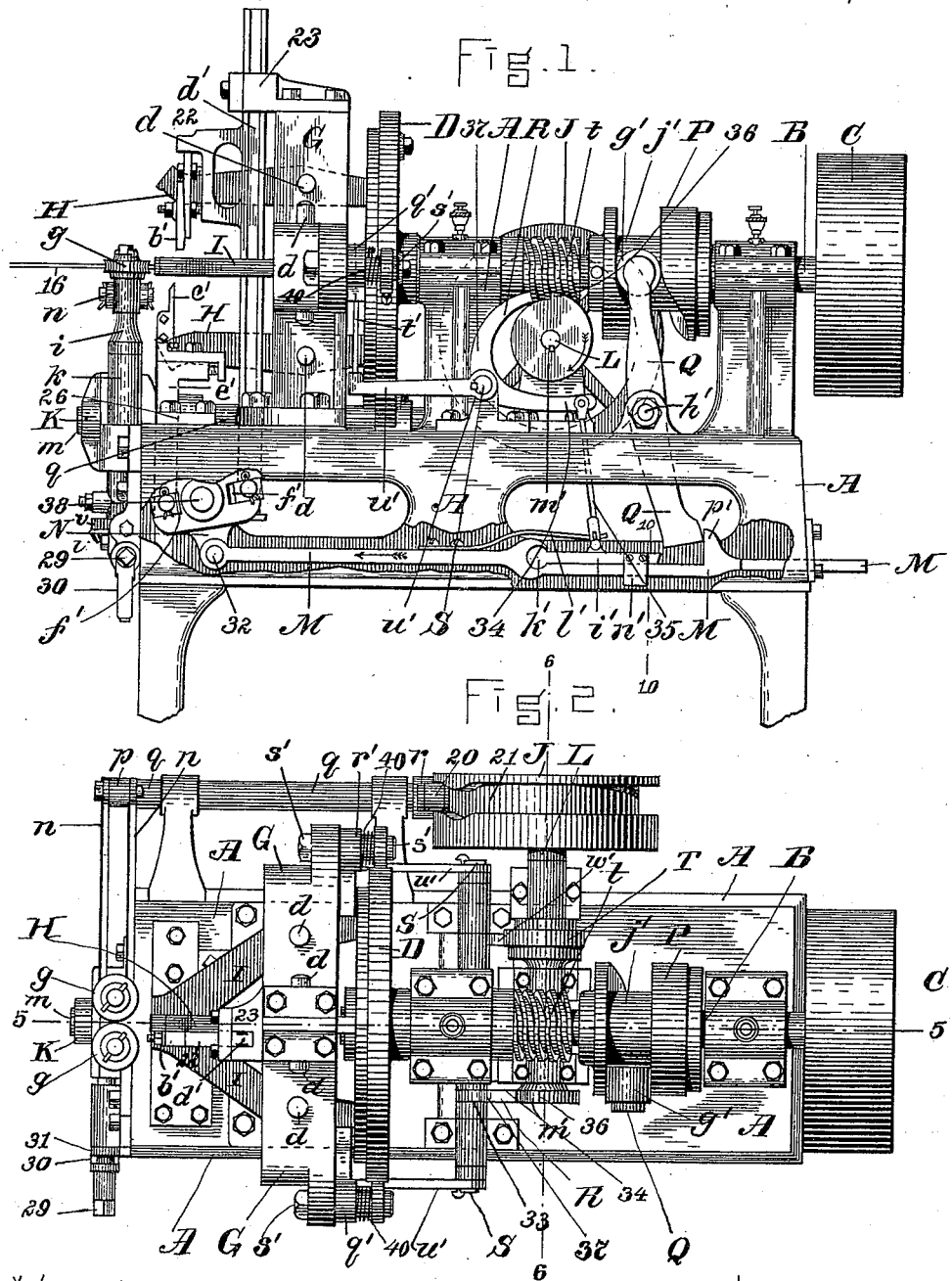

(No Model.) 4 Sheets—Sheet 1.

C. E. MOORE.
MACHINE FOR FORGING HORSESHOE NAILS.

No. 470,322. Patented Mar. 8, 1892.

WITNESSES.
Henry Marsh.
Harry W. Aiken.

INVENTOR.
Charles E. Moore,
by F. E. Teschemacher
Atty.

(No Model.) 4 Sheets—Sheet 2.
C. E. MOORE.
MACHINE FOR FORGING HORSESHOE NAILS.
No. 470,322. Patented Mar. 8, 1892.
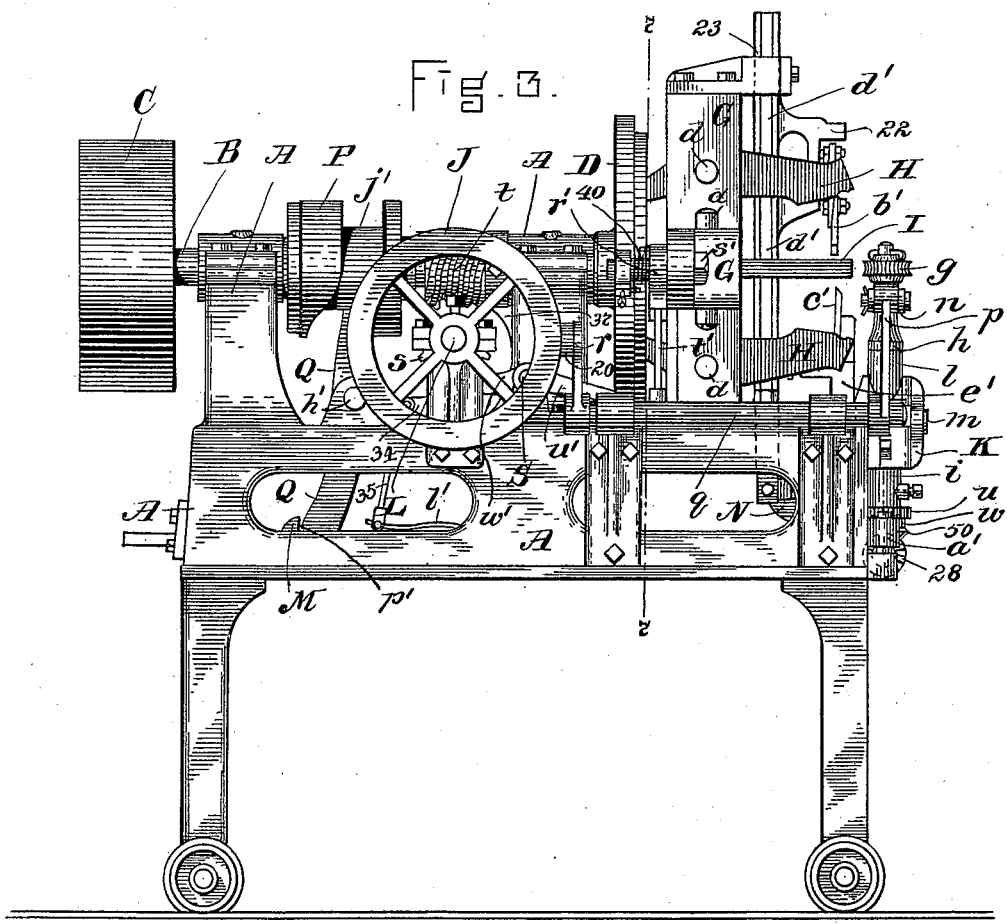
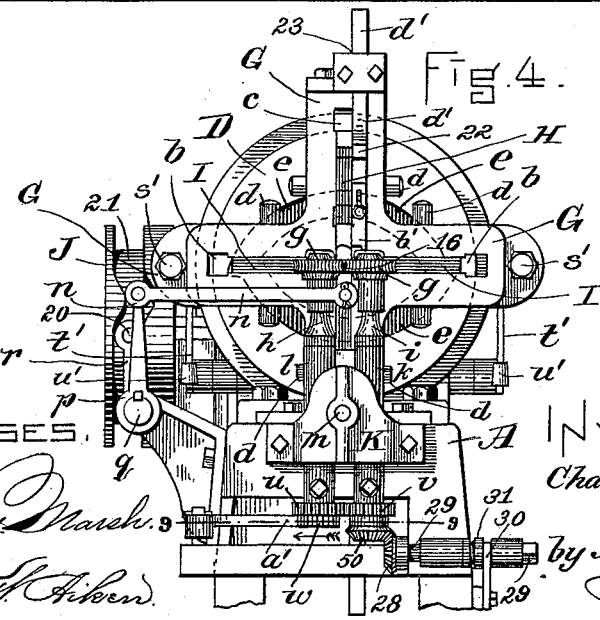
WITNESSES.
Henry Marsh.
Harry W. Aiken.
INVENTOR.
Charles E. Moore.
by J. C. Waschemacher
Atty

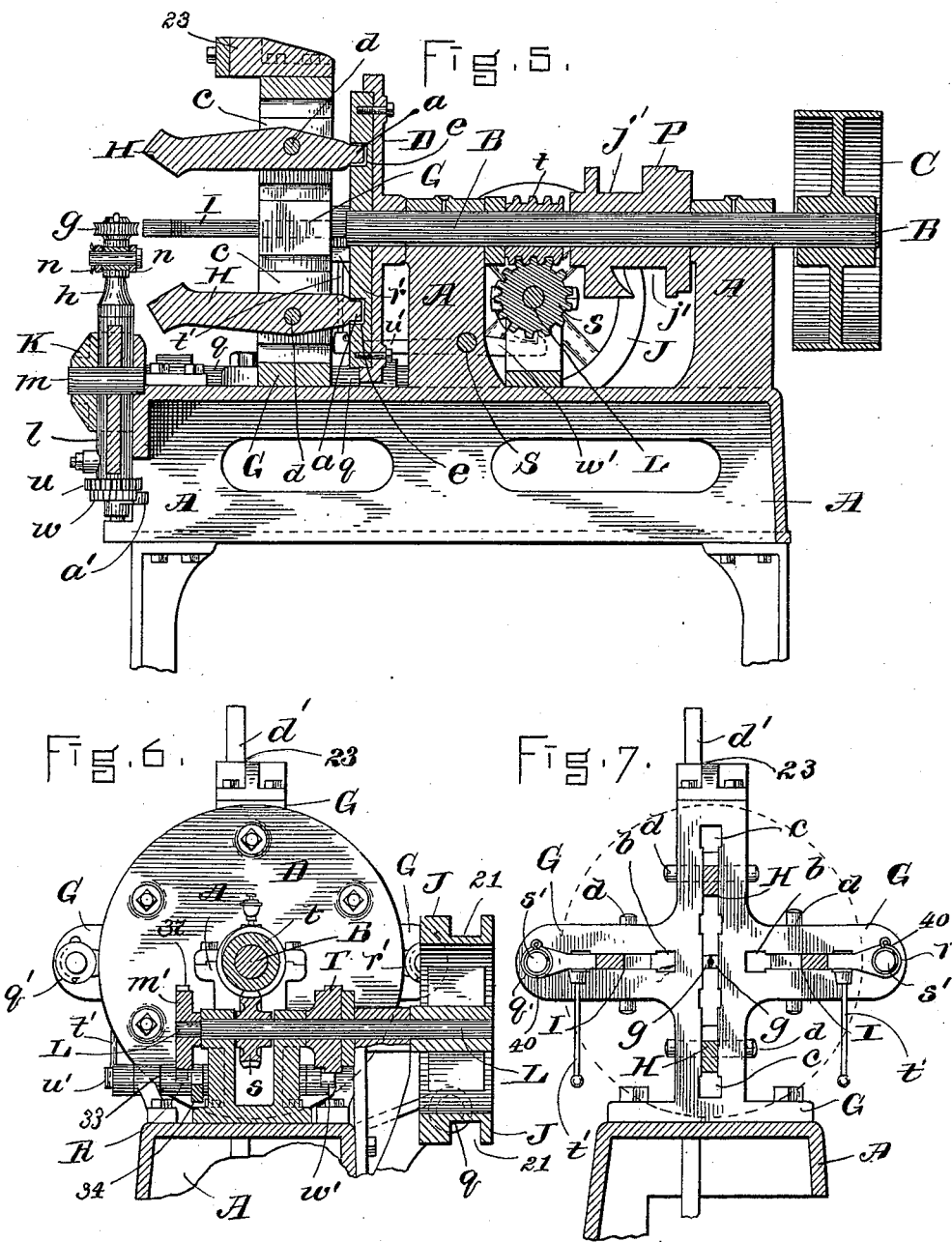

(No Model.) 4 Sheets—Sheet 4.
C. E. MOORE.
MACHINE FOR FORGING HORSESHOE NAILS.
No. 470,322. Patented Mar. 8, 1892.
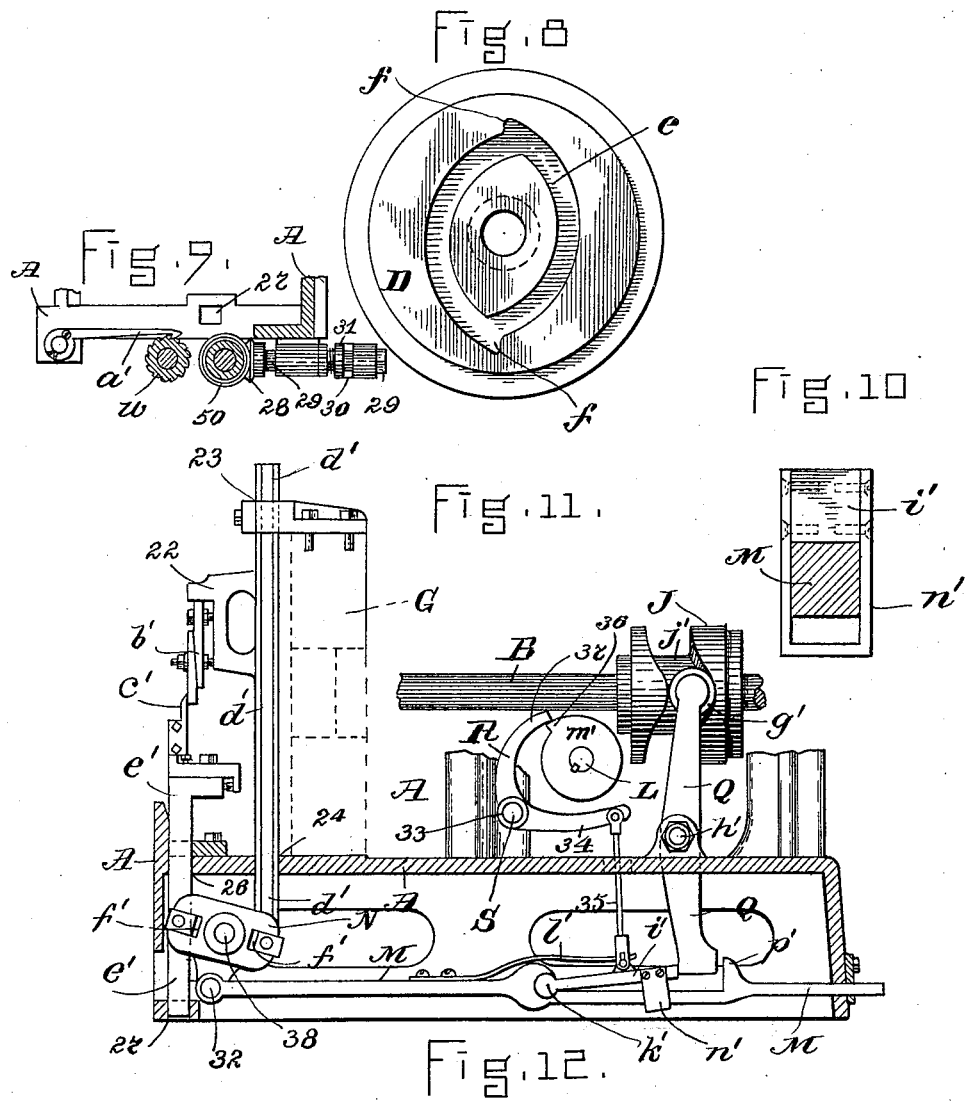

UNITED STATES PATENT OFFICE.

CHARLES E. MOORE, OF BOSTON, MASSACHUSETTS, ASSIGNOR TO ANN M. PUTNAM, OF SAME PLACE, AND GEORGE N. FLETCHER, OF DETROIT, MICHIGAN.

MACHINE FOR FORGING HORSESHOE-NAILS.

SPECIFICATION forming part of Letters Patent No. 470,322, dated March 8, 1892.

Application filed July 15, 1891. Serial No. 399,593. (No model.)

*To all whom it may concern:*

Be it known that I, CHARLES E. MOORE, a citizen of the United States, residing at Boston, in the county of Suffolk and State of Massachusetts, have invented certain Improvements in Machines for Forging Horseshoe-Nails, of which the following is a full, clear, and exact description, reference being had to the accompanying drawings, making part of this specification, in which—

Figure 1 is a side elevation of a machine for forging horseshoe-nails constructed in accordance with my invention, a portion of the frame-work being broken away to show the parts behind. Fig. 2 is a plan of the same. Fig. 3 is an elevation of the side of the machine opposite to that shown in Fig. 1. Fig. 4 is a front elevation of the machine. Fig. 5 is a longitudinal vertical section on the line 5 5 of Fig. 2. Fig. 6 is a transverse vertical section on the line 6 6 of Fig. 2. Fig. 7 is a transverse vertical section on the line 7 7 of Fig. 3. Fig. 8 is a front elevation of the cam-wheel which operates the hammers. Fig. 9 is a horizontal section on the line 9 9 of Fig. 4. Fig. 10 is an enlarged sectional detail on the line 10 10 of Fig. 1. Fig. 11 is a side elevation of a portion of the mechanism shown in Fig. 1, the parts being shown in the positions which they occupy when the cutters are being operated to cut off the finished nail. Fig. 12 is a detail to be referred to.

My invention relates to certain improvements on the machine for forging horseshoe-nails for which Letters Patent of the United States, No. 432,634, were granted to me July 22, 1890, in which the hammers are operated in pairs by means of a cam-wheel, and has for its object to render the mechanism more certain and reliable in its action and to produce a machine which can be run at great speed without liability of breakage or derangement of the parts.

To this end my invention consists in certain novel combinations of parts and details of construction, as hereinafter set forth and specifically claimed.

In the said drawings, A represents the bed or frame of the machine, which is mounted on wheels to enable it to run on a track, whereby it may be conveniently moved toward and from the furnace in which the nail-rods are heated or wherever otherwise required for use.

B is the main or driving shaft, which turns in suitable bearings in the frame-work and carries at one end the driving-pulley C and at the opposite end a large cam-wheel D for actuating the hammers, as hereinafter described.

From the bed A rises a frame G, made in the form of a cross and having four slots—two horizontal ones $b\,b$ and two vertical ones $c\,c$—in which are placed the hammers H H I I, which vibrate on pivots $d$, passing through the frame G. These hammers, arranged as described, are operated alternately in pairs by the groove $e$ of the cam-wheel D, within which fit the rear ends or helves $a$ of the hammers, the form of the groove $e$ being such that when the two side hammers are thrown toward each other to give the blow the upper and lower hammers will be simultaneously drawn back, and vice versa, the hammers being thus actuated in both directions without the aid of springs or other auxiliary devices and caused to act upon all four sides of the nail being forged.

The cam-groove $e$ is provided at two points diametrically opposite each other with recesses or enlargements $f$, Fig. 8, into which the helves of each pair of hammers enter a short time previous to their operative faces being brought together, whereby sufficient play or loose movement of the hammers is produced previous to their contact with the nail-rod to cause them to strike the same with a rebounding blow similar to that struck by an ordinary hammer when held in the hand, the greater part of the forward movement of each pair of hammers being produced positively by the cam-groove, while the remainder or latter portion of the forward movement is effected by the momentum of the hammers themselves, which causes them when running at a high rate of speed to be carried forward with sufficient force to give a smart and powerful drawing-blow, after which they are free to rebound or recede from the heated nail-rod, as the recesses $f$ are of the proper length and shape to admit of this movement. The pivots on which the hammers oscillate are located near their rear ends, thus placing the larger and heavier portion of each hammer in front of its pivot, whereby the momentum of the hammers is increased as they are thrown forward by the cam to give the blow. The faces of the hammers are provided, as usual, with suitable grooves or dies of the proper form to give the nail the desired shape. By releasing the hammers from the positive action and control of the cam-groove just previous to their contact with the nail-rod, as described, and allowing them to complete their movement by their own momentum and then rebound before being acted upon positively by the cam-groove and brought under its control a more concussive and instantaneous impact is produced, whereby the character or quality of the blow is improved and rendered much more effective, as it is a well-known fact that a gradual or positive blow, even at a very high rate of speed, will cool heated iron much more quickly than an instantaneous blow from a hammer carried forward by its own momentum and free to rebound or recede at the instant of its impact and that a blow from a hammer of the latter description will do more effective work at a much lower rate of speed than can be accomplished with a positively-actuated hammer.

It will be obvious that in this machine the absolute freedom of the hammers to rebound or recede from the iron at the instant of the delivery of the blow will diminish the actual time of contact of the hammer-face with the heated iron to a minimum, and thereby proportionately reduce its cooling effect upon the nail being formed, it being desirable to have the hammer-faces in actual contact with the nail-rod for the shortest possible length of time, as it is of the utmost importance to maintain the nail-rod at a white heat during the formation of the nail, as otherwise inferior results will be produced, and it is evident that the greater the length of time that the large cool body of iron composing the front end of the hammer remains in contact with the small portion of iron which forms the nail the sooner it will be reduced from a white to a red heat, in which latter condition the iron cannot be worked to advantage.

The above-described cam-wheel, with its groove, and the manner in which it actuates the hammers are substantially the same as shown and described in my aforesaid Letters Patent No. 432,634, and form no part of my present invention.

I will now proceed to describe the manner in which the nail-rod is fed into the machine.

$g$ $g$ are a pair of feed-rolls, the peripheries of which are slightly concave and are provided with sharp teeth to prevent them from slipping on the nail-rod 16 as the latter passes between them. These rolls are secured to the upper ends of a pair of vertical shafts $h$ $i$, supported in bearings $k$ $l$ in the frame or carrier K, pivoted on a pin or stud $m$, projecting from the front of the frame-work, as seen in Fig. 4, and operated by rods $n$ $n$, pivoted thereto and at their opposite ends to a lever $p$, secured to the front end of a horizontal rock-shaft $q$, supported in bearings on one side of the bed or frame A and carrying an arm or lever $r$, Figs. 2 and 3, at the upper end of which is an anti-friction roll 20, which runs in a cam-groove 21 of a cam-wheel J, secured to one end of a transverse shaft L, having its bearings in the frame-work, said shaft being provided with a worm-wheel $s$, which is engaged by a worm $t$ on the main shaft B, whereby as the cam-wheel J is rotated the frame K is rocked on its pivot $m$ to carry the nail-rod over into the path of the cutters, to be hereinafter described, and return it to its normal central position between the hammers.

To the shafts $h$ $i$, near their lower ends, are secured the gears $u$ $v$, Fig. 4, which engage with each other, and at the lower end of the shaft $h$ is secured a ratchet-wheel $w$, with the teeth of which engages a stationary spring-pawl $a'$, secured to the front of the frame A, whereby as the frame K is oscillated on the pivot $m$ as a center by the mechanism above described the feed-rolls are intermittingly rotated to carry forward the nail-rod at the required times, each movement of the lower end of the shaft $h$ in the direction of the arrow, Fig. 4, causing the pawl $a'$ to engage a new tooth of the ratchet-wheel $w$, while the movement of the shaft $h$ in the opposite direction produces a partial rotation of the said ratchet-wheel by reason of one of its teeth being engaged by the pawl $a'$.

The amount of movement of the ratchet-wheel $w$ is so arranged as to produce the exact amount of feed of the nail-rod required for a nail of the length desired, and the mechanism is so timed that the nail-rod will be fed forward while it is being swung back with the frame K to its central position after the nail last made has been severed therefrom. To the lower end of the shaft $i$ is secured a bevel-wheel 50, with which engages a bevel-wheel 28, secured to the inner end of a horizontal shaft 29, the outer end of which is adapted to receive the end of a removable handle, (not shown,) by means of which the feed-rolls can be rotated by hand when the nail-rod is first entered between them, so that it can be readily carried forward into a position to be operated upon by the hammers. When the machine is in operation, this horizontal shaft 29 is slid back within its bearings, so as to disconnect the bevel-wheel 28 from the bevel-wheel 50 on the shaft $i$, the shaft 29 being held back by a latch 30, Figs. 1, 2, and 4, which fits on either side of a collar 31 on the shaft 29, whereby it is adapted to lock said shaft with its bevel-wheel 28 either in or out of engagement with the bevel-wheel 50.

$b'$ $c'$ are the cutters by which the finished nail is severed from the nail-rod after being formed by the hammers. The upper cutter $b'$ is secured to a horizontal projection or offset 22 on the upper end of a vertical bar $d'$, which slides in suitable guides or bearings 23 24 in the frame-work, and the lower cutter $c'$ is secured to the upper end of a vertical bar $e'$, which also slides in suitable guides or bearings 26 27 in the frame-work, the cutters being secured to the bars $d'$ $e'$ by means of screws and slots, whereby they may be adjusted horizontally in the direction of the length of the nail-rod to adapt them to cut off nails having heads of any desired length and vertically to allow for grinding and to cause them to meet at the exact level desired.

The sliding cutter-bars $d'$ $e'$ are moved simultaneously in opposite directions to cause the cutters to advance and sever the nail from the rod and then returned to their normal positions in the following manner:

M is a horizontal sliding bar, the rear end of which projects through an aperture in the frame-work A, which forms a bearing therefor, while its front end is pivoted at 32 to a T-shaped rocker N, pivoted at 38, to the opposite ends of the upper or horizontal portion of which, in slots $f'$, are pivoted the lower ends of the sliding cutter-bars $d'$ $e'$, whereby as the bar M is reciprocated by mechanism to be presently described the said cutter-bars are simultaneously moved in opposite directions to cause the cutters to advance and recede, as required.

When the nail is finished and ready to be cut off, it is moved laterally out of the path of the vertical hammers by the oscillation of the carrier-frame K and its feed-rolls on the pin $m$, previously described, this movement of the nail-rod bringing it into the path of the cutters just before the latter are brought together.

The horizontal bar M is reciprocated to actuate the cutter-bars $d'$ $e'$ at the required times in the following manner: Upon the driving-shaft B is placed a cam-wheel P, within the groove $j'$ of which fits an anti-friction roll $g'$, mounted upon a stud projecting from the upper end of a rocker-arm or lever Q, fulcrumed at $h'$, the lower end of said lever Q as it is swung toward the front of the machine being adapted to strike the end of a latch-bar $i'$, pivoted at $k'$ to the bar M, and thus move the latter in the direction of the arrow, Fig. 1, when said latch-bar is raised against the resistance of a flat spring $l'$ into a position, as seen in Fig. 11, to be struck by the said lever Q. The elevation of the latch-bar $i'$ is produced by a curved or U-shaped lever R, loosely pivoted at 33 upon the end of a transverse shaft S, so as to move independently thereof, and having its lower arm 34 connected with the latch-bar $i'$ by a rod 35, within a slot or aperture in which, just above the point where it is pivoted to the latch-bar $i'$, is fitted the end of the spring $l'$, which serves to normally hold the said latch-bar down upon the bar M, as seen in Fig. 1. The lever R is lifted by a cam or projection 36 on a wheel $m'$, which acts on the upper or shorter arm 37 of the lever R, thereby causing the latch-bar $i'$ to be raised as desired with a positive movement into a position to be struck by the lever Q. The wheel $m'$ is secured to one end of the worm-wheel shaft L, which is rotated, as before described, by the worm $t$ on the main shaft B acting on the worm-wheel $s$. A U-shaped guide-strip $n'$, which embraces the bar M, is riveted to the latch-bar $i'$, and is raised therewith until its bottom comes into contact with the under side of the bar M, serving as a stop to prevent said bar $i'$ from being accidentally thrown up out of place by the thrust or pressure against it of the lever Q in pushing forward the bar M. The shaft L and cam-wheel $m'$ are rotated with a steady continuous motion by the worm $t$ and worm-wheel $s$, as described, eight revolutions of the main shaft B being required to cause the cam-wheel $m'$, through the connections described, to raise the latch-bar $i'$ into a position to be engaged by the lower end of the rocker-lever Q as the latter is moved by the cam P to push the bar M forward in the direction of the arrow, Fig. 1, which movement of the bar M, through the connections described, causes the cutters to be brought together to sever the finished nail from the rod, the cam-wheel J at the opposite end of the shaft L being so timed as to cause the feed-roll frame K to move the nail-rod laterally into the path of the cutters before the latter are brought together. At the completion of the forward movement of the bar M the cam $m'$ passes out of contact with the upper arm 37 of the lever R, when the latch-bar $i'$ will be carried down by the spring $l'$ out of the path of the lever Q, which on its return movement bears against the projection $p'$ on the bar M, and thus moves the latter back to its original position, where it will remain stationary until after the latch-bar $i'$ has again been raised, when the operation will be repeated, as before. The groove of the cam-wheel P is of such shape that it will cause the lever Q to remain at rest after its lower end has been carried back, thus allowing sufficient time for the latch-bar $i'$ to be raised before the lower end of the lever Q again commences to advance. The return or backward movement of the bar M causes the cutters to recede from each other, and at the same time the cam-wheel J on the shaft L, through the connections described, causes the nail-rod to be swung over by its frame K into its proper central position with relation to the hammers and fed forward the exact amount required for the next nail. By thus providing the sliding bar M with a light latch-bar $i'$, adapted to be raised, as described, the necessity of lifting the entire bar M, as in my aforesaid patent, No. 432,634, is avoided, this lifting in the manner described in said patent of the entire horizontal bar having been found objectionable for the reason that when the machine is running at a very high rate of speed there is a liability of this heavy bar not being instantly lifted by the spring connected therewith, and consequently the rocker-lever would sometimes fail to engage with and move said horizontal bar and the cutters would not therefore be operated at the proper time. All of these defects are entirely obviated by the use of the latch-bar i', which is very light and is positively raised by a rod, as described. Furthermore, the mechanism employed for connecting the cutter-bars with the horizontal bar M is simple, durable, and not liable to get out of order—important considerations in a machine of this description adapted to run at a high speed.

In the machine herein described the nail is cut off flatwise, whereby a cleaner and more perfect cut can be given to its head than if it were cut off edgewise. Hence the vertical hammers must be arranged to give the last blow, which necessitates the employment of stops to catch the side hammers, which would otherwise interfere with the lateral movement of the nail-rod as it is swung over between the cutters. As, however, the side hammers are operated positively during the greater portion of their movement by the cam-groove e, as described, it is obvious that the stops can only be thrown into position to intercept the side hammers the instant when they are released from the control of the said cam-groove, which takes place when their helves or rear ends a enter the enlargements f, the stops then acting to hold back the hammers and prevent them from completing their forward movement by their own momentum, as would otherwise occur.

q' r' represent two stops, one for each of the side hammers, which stops are pivoted at s' to the frame G and are swung into and out of place by rods t', pivoted thereto, and at their lower ends to arms u', secured to the opposite ends of the transverse shaft S, supported in bearings on the frame-work, between which said shaft is provided with an arm w', Fig. 2, which is raised against the resistance of springs 40 by a cam-wheel T, Figs. 2, 6, and 12, on the transverse shaft L, and thus as said cam T is rotated the stops are operated at the proper times to intercept the hammers at the instant they pass out of the control of the cam-groove e and release them, when they are again brought under the control of the said cam-groove, whereby the hammers are prevented from coming into contact with the nail-rod while it is swung over between the cutters, as would occur if the stops were not employed.

The above-described stops form no part of my present invention and are substantially the same as those described in Letters Patent No. 442,987, granted to me December 16, A. D. 1890.

What I claim as my invention, and desire to secure by Letters Patent, is—

1. In a machine for forging horseshoe-nails, the combination, with the lever Q and the horizontally-reciprocating bar M, adapted to operate the vertically-sliding cutter-bars and cutters, as described, of the latch-bar i', pivoted to the bar M and adapted to be periodically raised into a position to be engaged by said lever Q to push forward the bar M, substantially as and for the purpose set forth.

2. In a machine for forging horseshoe-nails, the combination of the lever Q, the cam-wheel P for actuating the same, the horizontally-reciprocating bar M, adapted to operate the vertically-sliding cutter-bars and cutters and provided with a projection p', the latch-bar i', pivoted to the bar M and provided with the guide-stop n', the spring l', rod 35, lever R, and cam-wheel m', all operating substantially as and for the purpose described.

3. In a machine for forging horseshoe-nails, the combination of the vertically-sliding cutter-bars and their cutters, the rocker N, having the cutter-bars pivoted to its opposite ends, the horizontally-reciprocating bar M, provided with the projection p', the pivoted latch-bar i' and means for raising the latter, and the lever Q, actuated by the cam-wheel P and adapted to engage the latch-bar i' when raised to push forward the bar M and actuate the cutter-bars and cutters, substantially as described.

4. In a machine for forging horseshoe-nails, the combination, with the hammers operated alternately in pairs by a cam-wheel on the main or driving shaft, of the vertically-sliding cutter-bars d' e', carrying the cutters, the rocker N, having the lower ends of the cutter-bars connected therewith, the horizontally-reciprocating bar M, connected at one end with the rocker N and provided with the pivoted latch-bar i' and the projection p', the lever Q, adapted to alternately engage said latch-bar and projection, the cam-wheel P on the driving-shaft B, adapted to actuate the lever Q, the lever R, connected with the latch-bar i' by a rod 35, the spring l', and the cam-wheel m' on the shaft L, the latter provided with a worm-wheel driven by a worm on the shaft B, all operating substantially in the manner and for the purpose described.

5. In a machine for forging horseshoe-nails, the combination, with the hammers operated alternately in pairs by a cam-wheel on the main or driving shaft, of the shaft L, carrying the cam-wheel J and provided with a worm-wheel s, driven by a worm t on the main shaft B, the oscillating frame or carrier K, with its feed-rolls and their connected shafts, suitable connections between the frame K and the cam-wheel J, whereby the said carrier-frame is oscillated at the required times, a ratchet-wheel and pawl for intermittingly rotating the feed-rolls, the lever Q, actuated by the cam-wheel P, the cam-wheel m', secured to the shaft L, the lever R, horizontal bar M, the cutters and the vertically-sliding cutter-bars, the latter connected with the bar M by the rocker N, and the latch-bar $i'$, pivoted to the bar M and connected with the lever R, whereby as the cutters commence their movement toward each other the nail-rod will be simultaneously moved by the frame K into the path of the cutters, substantially as described.

Witness my hand this 16th day of June, A. D. 1891.

CHARLES E. MOORE.

In presence of—
P. E. TESCHEMACHER,
CHARLES E. WYMAN.